3,061,406
PROCESS FOR THE PRODUCTION OF TRIFLUO-
RIDE OF HYPOPHOSPHOROUS ACID AND
PRODUCT THEREOF
Bruno Blaser, Dusseldorf-Urdenbach, and Karl-Heinz
Worms, Dusseldorf, Germany, assignors to Henkel &
Cie., G.m.b.H., Dusseldorf-Holthausen, Germany
No Drawing. Filed Jan. 9, 1961, Ser. No. 81,261
Claims priority, application Germany Jan. 12, 1960
2 Claims. (Cl. 23—14)

The invention relates to novel compounds, i.e., fluorides of phosphorous and hypophosphorous acid, respectively, and to a process for their manufacture.

It has been found that phosphorous acid and hypophosphorous acid react with hydrofluoric acid, low in water-content, and especially with anhydrous hydrofluoric acid, with formation of fluorides of the above acids, which are gaseous at room temperature.

When anhydrous hydrofluoric acid, at temperatures closely below its boiling point, is poured over anhydrous phosphorous or hypophosphorus acid, a strong reaction occurs which, with larger quantities, can lead to explosions with simultaneous formation of decomposition products.

Too strong a reaction can be avoided, for instance, by mixing the reaction components at low temperatures and allowing the mixture to warm gradually. It also is feasible to add the reaction components in small amounts and in such proportions in which they are consumed.

When hypophosphorous acid is dissolved at low temperatures (−78° C.) in an excess anhydrous hydrofluoric acid, and the temperature of that solution is allowed to rise gradually to approximately 30° C., a volatile fluoride distills which can be freed from entrained hydrofluoric acid by fractionation through a column. The boiling point of the pure compound thus obtained, at 760 mm. Hg, is 1 to 3° C., its melting point −52° C. The compound also can be purified by allowing the crude product to attain a semisolid state at low temperatures and decanting the liquid components from the crystals.

The reaction proceeds according to the following Equation 1:

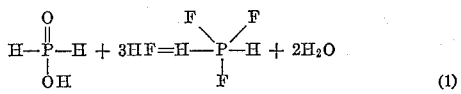
(1)

Halides of hypophosphorous acid have not been known to date. Further properties of the new compound are described in Example 1.

When anhydrous phosphorous acid is dissolved at −78° C. in an excess anhydrous hydrofluoric acid, even at the low a temperature a gas evolves which evolution increases upon gradual warming of the solution. According to Equation 2,

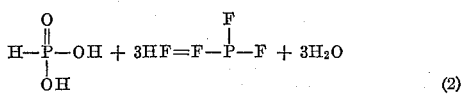
(2)

phosphorus trifluoride is obtained, a compound which has been known for some time, albeit prepared by other methods. In addition, at bath temperatures ranging from −40° to −20° C., a higher-boiling fraction boils out of the reaction mixture whose composition corresponds to the formula $PHF_4$. The analysis and properties of this compound are given in Example 2.

Similar results are obtained when such acids of phosphorus are employed, in lieu of phosphorous acid, which yield phosphorous acid upon hydrolysis, e.g., acids having the structural Formulas 3 and 4, respectively:

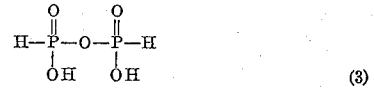
(3)

and

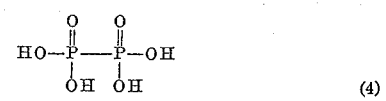
(4)

These acids first are split by hydrofluoric acid, and the phosphorus split products then react with formation of phosphorus trifluoride and of the boiling fraction having the formula $PHF_4$.

The formation takes place according to Equation 5:

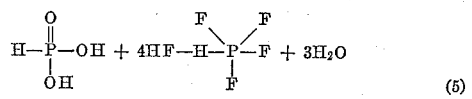
(5)

The fluorides according to the invention react with water to hydrofluoric acid and hypophosphorous or phosphorous acid, respectively. With organic compounds, such as alcohols, or amines, they react strongly to the derivatives, e.g., esters or amides, respectively. The organic derivatives in part exhibit insecticidal properties, like the fluorides themselves.

The preparation of the phosphorous fluorides and their distillation on a laboratory scale was accomplished in apparatus consisting of commercial polyethylene bottles with stoppers made of polytetrafluoroethylene having the appropriate holes therein, and hose made of commercial polyethylene. For the fractionation of the compounds, a column was employed consisting of a 700 mm. long polyethylene tube having an inside diameter of 11 mm., filled with short pieces of fine polyethylene hose. The column was water-cooled externally In order to avoid delays in boiling, the polyethylene bottles from which the distillations were carried out were shaken by means of a vibrator. All apparatus parts were dried carefully, and the entrance of moist air was prevented. Certain water contents do not prevent the reaction from taking place, especially when large excesses hydrofluoric acid are used. For instance, reactions can be carried out with 90% hydrofluoric acid; however, under no circumstances is a water content of the solution an advantage over anhydrous solutions.

The new compounds $PH_2F_3$ and $PHF_4$ are useful as insecticides and for etching of glass products.

The invention now will be further illustrated by the following examples. However, it should be understood that these are given merely by way of explanation, not of limitation, and that numerous changes may be made in the details without departing from the spirit and the scope of the invention as hereinafter claimed.

*Example 1*

45 g. hypophosphorous acid, dried by prolonged dwell in a vacuum desiccator and containing approximately 2 percent each water and phosphorous acid, were cooled with a $CO_2$-acetone mixture to −78° C., and then 300 g. anhydrous hydrofluoric acid were poured over the cooled hypophosphorous acid. The hydrofluoric acid, likewise, had been cooled with an acetone-$CO_2$ mixture to −78° C. prior to pouring. The bulk of the hypophosphorous acid was brought into the solution by shaking in a $CO_2$-bath. The distilling flask then was connected to a fractionating column, and the vibrator set in motion. The bath temperature was allowed to rise gradually to 29° C. while the temperature of the column was held at 5° C.

The distillate still contained a certain amount of hydrofluoric acid, so that it was necessary to fractionate it four times in order to obtain an analytically pure product. An intermediate fraction was separated into liquid and solid components by cooling.

The yield was 38 g. $PH_2F_3$ or 62 percent of theory, calculated on the hypophosphorous acid employed. The compound had a boiling point of 1–3° C. at 760 mm. Hg and solidified below −52° C. to well-formed crystals. The colorless liquid exhibited only very slight electrical conductivity. When the gas flowed into moist air, a strong fog-formation occurred. The liquid or solid compound, when stored cold, did not decompose even after a prolonged period of time. Aqueous dilute alkalies hydrolized rapidly according to the Equation 6:

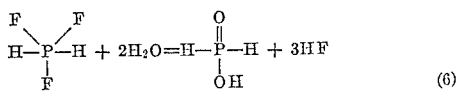

(6)

The atomic ratio P:F in the $PH_2F_3$ fraction in the solution was 1:3.01; calculated: 1:3.

Example 2

65 g. anhydrous phosphorous acid were combined with 300 g. anhydrous hydrofluoric acid in a polyethylene bottle at −78° C. The bottle was then connected to a fractionating column, and the phosphorous acid dissolved by careful shaking at −78° C. The column was cooled with a salt solution having a temperature of −22° C. The temperature of the reaction bottle was allowed to rise gradually to 0° C, during the four hour-long distillation. The distillate was collected in a polyethylene bottle which was cooled with liquid air. At a bath temperature of −78° C., a $PF_3$-fraction was distilled, and at a temperature of −40 to 0° C., using the fractionating column held at −22° C., a $PHF_4$-fraction. By redistillation at bath temperatures of −78° C. and of −40 to 0° C., respectively, both fractions were further purified.

The composition of both fractions was determined from hydrolizates in alkali hydroxide solutions.

(a) $PF_3$-fraction: Atomic ratios, P:F=1:3.21 (in other experiments 1:3.03; 1:3.14; 1:3.04); calculated 1:3.

(b) $PHF_4$-fraction: Atomic ratios, P:F=1:3.99 (in other experiments 1:4.21; 1:3.82); calculated 1:4.

The yield was 69 percent of theory $PF_3$ and approximately 10–12 percent $PHF_4$.

Example 3

Into a small polyethylene vessel two drops of a solution 4.4 g. $PH_2F_3$ in 100 ml. anhydrous alcohol were poured. This was allowed to stand in the room uncovered. Flies within a distance of 20–25 cm. from the solution died within a short time, generally after approximately 2 minutes. Upon direct contact of the flies with the solution, strong paralysis set in immediately, and the flies died soon thereafter.

Example 4

Thin glass panes were inserted in a solution of 3 g. $PH_2F_3$ or of 3 g. $PHF_4$ in 1 liter anhydrous benzene. After exposure for a few minutes in either of these solutions, the panes were removed and rinsed with water. They were uniformly etched.

We claim as our invention:

1. A process for the production of the trifluoride of hypophosphorous acid having the formula $PH_2F_3$, which comprises dissolving hypophosphorous acid in an excess over the molar proportions of anhydrous hydrofluoric acid at a temperature of substantially −78° C., allowing the temperature to rise to 30° C., and separating the $PH_2F_3$ thus formed.

2. The trifluoride of hypophosphorous acid of the formula $PH_2F_3$.

References Cited in the file of this patent

UNITED STATES PATENTS

| | | |
|---|---|---|
| 2,408,784 | Lange et al. | Oct. 8, 1946 |
| 2,481,807 | Anderson | Sept. 13, 1949 |
| 2,488,298 | Lange et al. | Nov. 15, 1949 |

OTHER REFERENCES

Mellor: "Comprehensive Treatise on Inorganic and Theoretical Chemistry," vol. 8, pages 997–998, 1928, Longmans Green & Co.